United States Patent [19]

Takiguchi

[11] Patent Number: 4,516,139
[45] Date of Patent: May 7, 1985

[54] PRINT CONTROL SYSTEM IN A COLOR IMAGE PRINTER

[75] Inventor: Masahiro Takiguchi, Tenri, Japan

[73] Assignee: Sharp Kabushiki Kaisha, Osaka, Japan

[21] Appl. No.: 547,401

[22] Filed: Oct. 31, 1983

[30] Foreign Application Priority Data

Nov. 5, 1982 [JP] Japan ............................. 57-195008
Nov. 5, 1982 [JP] Japan ............................. 57-195009
Nov. 5, 1982 [JP] Japan ............................. 57-195010

[51] Int. Cl.³ .......................... G01D 15/16; H04N 1/22
[52] U.S. Cl. ............................... 346/140 R; 346/75; 358/75; 358/296; 358/298
[58] Field of Search ............... 346/75, 140 R; 358/75, 358/76, 296, 298

[56] References Cited

U.S. PATENT DOCUMENTS 4,314,263 2/1982 Carcey ........................ 346/140 R
4,413,275 11/1983 Horivchi et al. ................ 358/75

Primary Examiner—E. A. Goldberg
Assistant Examiner—Gerald E. Preston
Attorney, Agent, or Firm—Birch, Stewart, Kolasch & Birch

[57] ABSTRACT

A print control system for a color ink jet system printer includes a yellow print buffer, a magenta print buffer, a cyan print buffer and a black print buffer. Image information and character information are applied from a data processing apparatus to the print control system. The image information includes a color data and a pattern data. The image pattern data is introduced into a selected print buffer in accordance with the image color data. The character information includes a color data and a character code data. The character code data is applied to a pattern generator which develops a character pattern data. The thus developed character pattern data is applied to a selected print buffer in accordance with the character color data, whereby a combined pattern data is obtained in the print buffers.

4 Claims, 23 Drawing Figures

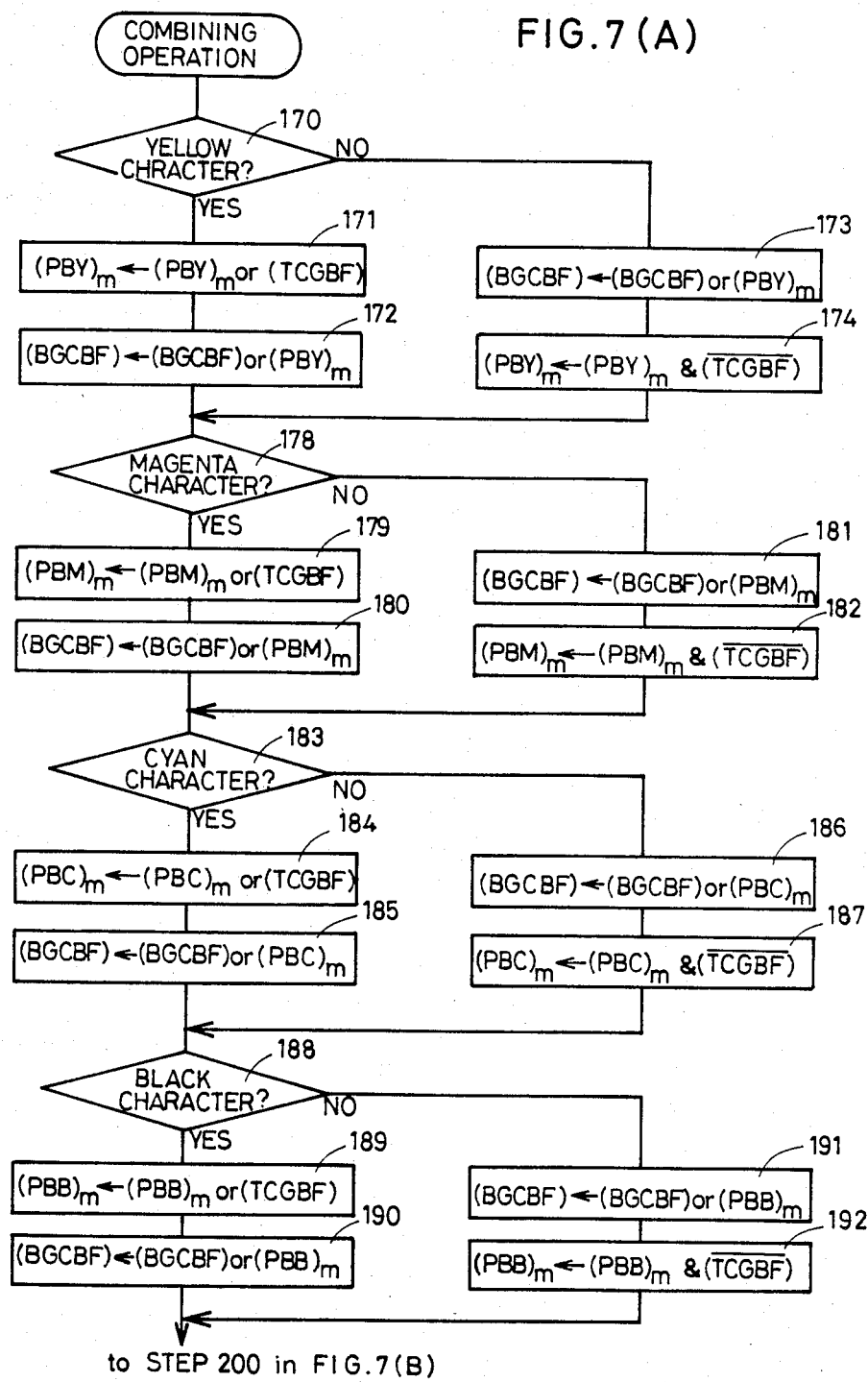

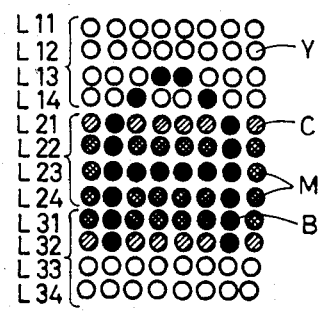
FIG. 8
FIG.9(A)    FIG.9(B)    FIG.9(C)
(BGCBF)
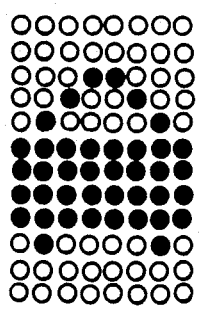 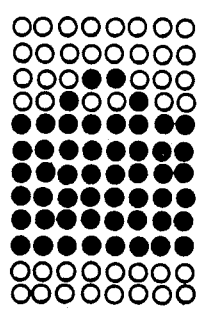
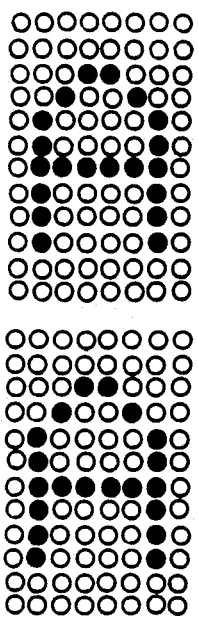
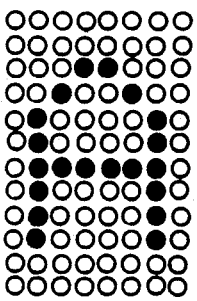
FIG.9(D)

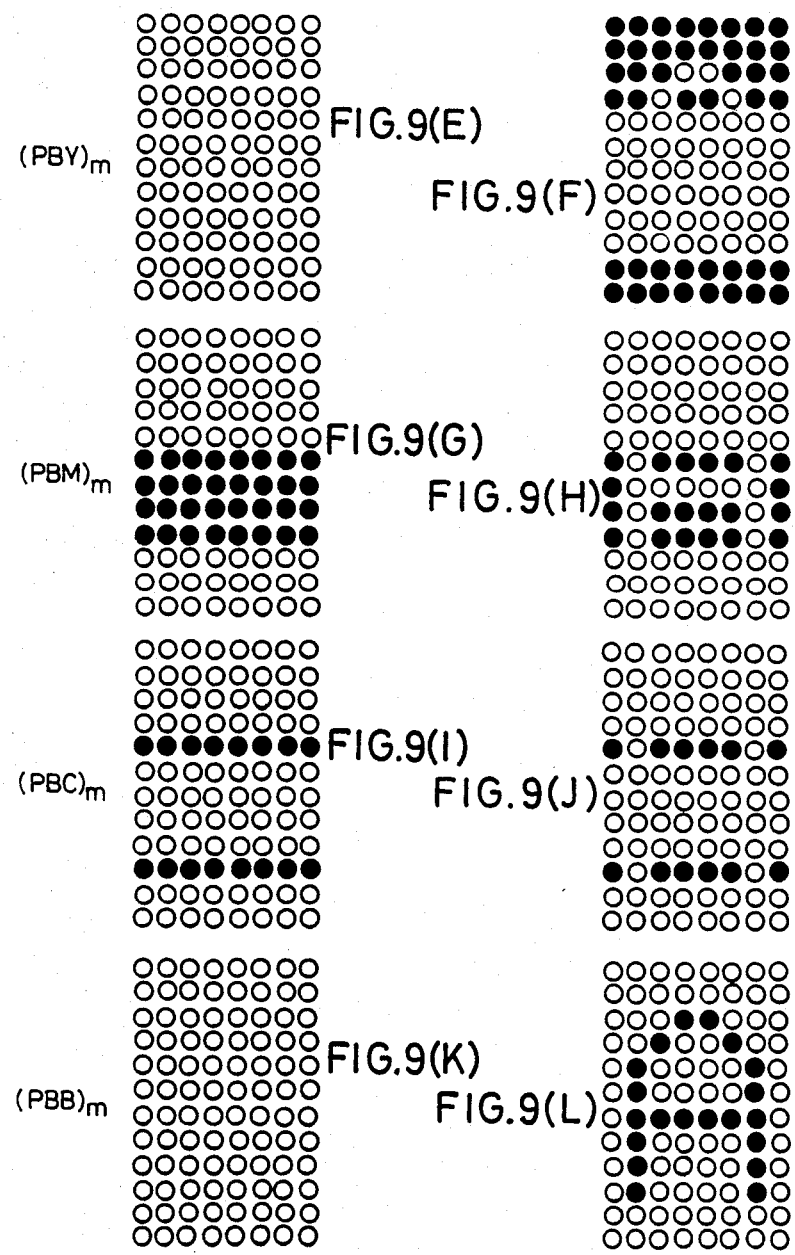

PRINT CONTROL SYSTEM IN A COLOR IMAGE PRINTER

BACKGROUND OF THE INVENTION

The present invention relates to a color image printer for printing a multi-color image in a dot matrix fashion.

The present invention relates, more particularly, to a color ink jet system printer which includes a printer head for emitting yellow ink droplets, magenta ink droplets, cyan ink droplets, and black ink droplets toward a record receiving paper, thereby printing a multi-color image in a dot matrix fashion.

The present invention relates, more specifically, to a print control system in a color ink jet system printer for effectively combining character information, image information, and background color information.

An example of the color ink jet system printer of the ink-on-demand type is described in copending application, "COLOR INK JET SYSTEM PRINTER", Ser. No. 488,827, filed on Apr. 26, 1983 by Yoshio KANAYAMA and assigned to the same assignee as the present application. The German counterpart is No. P 33 15 514.3 filed on Apr. 29, 1983. The color ink jet system printer generally includes a nozzle unit having at least four orifices for emitting yellow ink droplets, magenta ink droplets, cyan ink droplets, and black ink droplets, respectively. The nozzle unit is mounted on a carriage which travels in the lateral direction so that a multi-color printing is carried out in a dot matrix fashion with the ink droplets emitted from the nozzle unit.

In such a color ink jet system printer, color printing is carried out as shown in FIG. 8, wherein character information (character "A", printed by black ink droplets B), image information (image pattern printed on lines L21, L22, L23, L24, L31 and L32 by cyan ink droplets C and magenta ink droplets M), and background color information (background printed on Lines L11, L12, L13, L14, L33 and L34 by yellow ink dropltes Y) are printed out in a composite pattern. In the conventional system, the composite pattern information is formed at a data processing system connected to the color ink jet system printer. Then, the composite pattern information is applied to the color ink jet system printer as an image data. That is, the character data is converted into an image data in the data processing system, and the thus obtained image data representing the character pattern is combined with the image information and the background color information in the data processing system.

Thus, in the conventional system, the data processing system is required to perform a complicated work.

OBJECTS AND SUMMARY OF THE INVENTION

Accordingly, an object of the present invention is to provide a color image printer which effectively prints out a combined character pattern, image pattern and background color.

Another object of the present invention is to provide a print control system in a color ink jet system printer of the ink-on-demand type, for effectively combining character patterns, image patterns and background color.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, character code information is introduced from a data processing system into a control system of a color image printer, and the character code information is stored in a character buffer. The control system includes a character pattern generator which develops a pattern signal in accordance with the character code information stored in the character buffer. The control system includes four print buffers for storing the print data for yellow printing, magenta printing, cyan printing and black printing. The pattern signal developed from the chatacter pattern generator is applied to one of the four print buffers in accordance with a color indicating data separately applied to the control system. An image data is applied from the data processing system to the control system in addition to the character code information. The image data is independently introduced into a selected print buffer, wherein the image data and the character pattern signal are combined with each other. The combined pattern data stored in each of the four print buffers are applied to corresponding printer heads for conducting the yellow printing, magenta printing, cyan printing and black printing, respectively.

In a preferred form, a priority is applied to the character pattern signal so as not to print the image data at a point where the image pattern overlaps the character pattern.

The control system further includes a background pattern generating unit which develops the background pattern by inverting the character pattern signal. The data processing system develops a control signal for indicating the background color so that the thus obtained background pattern data is applied to a selected print buffer.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 7(A) and 7(B) are flow charts for explaining a combined pattern forming operation conducted by the print control system of FIG. 3;

FIG. 8 is a plan view schematically showing an example of a printout produced by the color ink jet system printer of FIG. 1; and FIGS. 9(A) through 9(L) are charts for explaining the contents stored in print buffers included in the print control system of FIG. 3.

DESCRIPTION OF THE PREFERRED EMBODIMENTS

Figure 1:
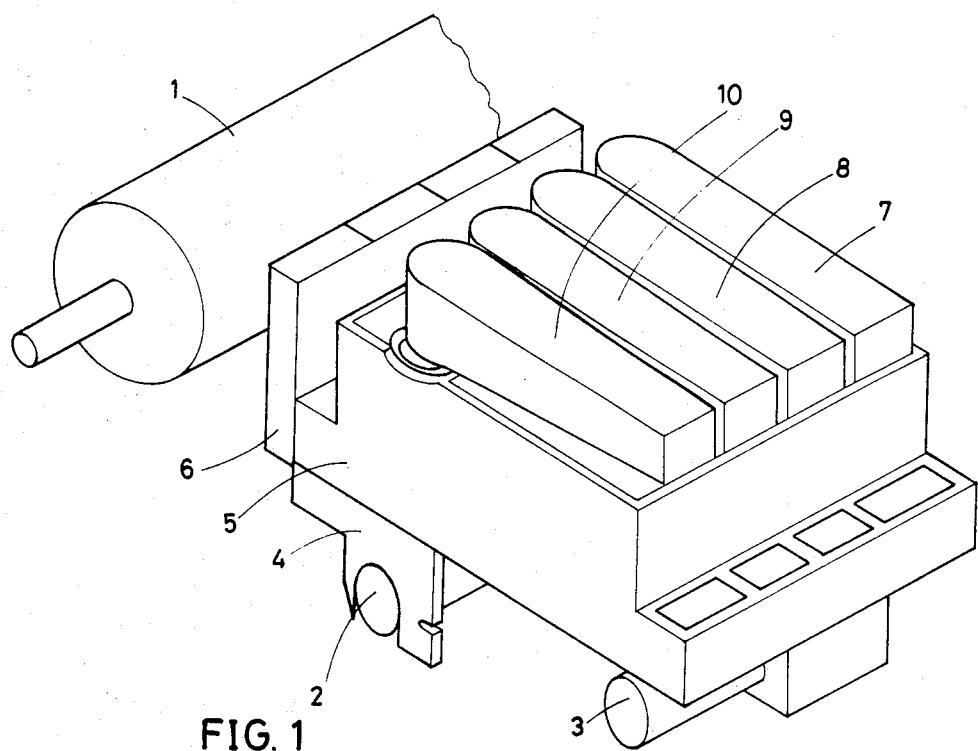
FIG. 1 is a perspective view of a color ink jet system printer of the ink-on-demand type employing an embodiment of a print control system of the present invention.

A color ink jet system printer of the ink-on-demand type generally includes a platen 1 for supporting a record receiving paper. A pair of slide shafts 2 and 3 are disposed in front of the platen 1 to parallel the platen 1. A carriage 4 is slidably mounted on the pair of slide shafts 2 and 3. A drive mechanism (including a pulse motor) is connected to the carriage 4 in order to shift the carriage 4 along the pair of slide shafts 2 and 3. That is, the printing operation is carried out while the carriage 4 travels in the lateral direction in front of the platen 1.

A printer head is mounted on a carriage 4. The printer head includes an ink liquid reservoir 5 for containing yellow ink, magenta ink, cyan ink and black ink, and a nozzle unit 6 which confronts the record receiving paper supported by the platen 1. Ink cartridges 7, 8, 9 and 10 are removably set on the ink liquid reservoir 5. The ink cartridge 7 contains yellow ink, the ink cartridge 8 contains magenta ink, the ink cartridge 9 contains cyan ink, and the ink cartridge 10 contains black ink.

Figure 2:
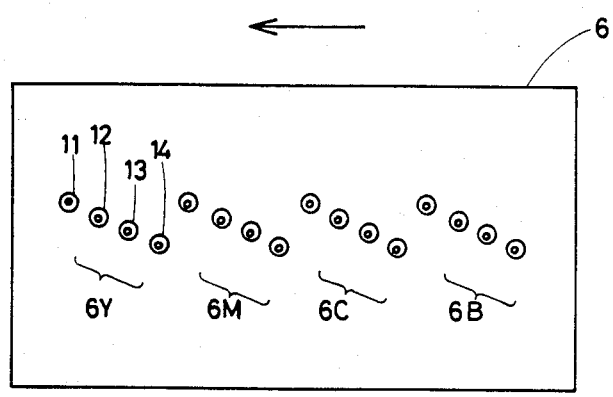
FIG. 2 is a front view of a nozzle unit included in the color ink jet system printer of FIG. 1.

FIG. 2 schematically shows the nozzle unit 6. The nozzle unit 6 is provided with four yellow orifices 6Y (11, 12, 13, 14), four magenta orifices 6M, four cyan orifices 6C, and four black orifices 6B. Each orifice 11, 12, 13 and 14 in the respective group corresponds to one dot position in the dot matrix array. That is, four rows in the matrix array are printed at a same time in the color ink jet system printer of FIG. 1. The first orifice 11 in the yellow orifices 6Y is spaced from the first orifice in the magenta orifices 6M by a distance corresponding to 8 (eight) dot positions, and they are aligned in the lateral direction. If one character is printed in a matrix of 12 (in the vertical direction)×8 (in the lateral direction) dots, the character is printed out when the carriage 4 performs the lateral direction travel three times.

Figure 3:
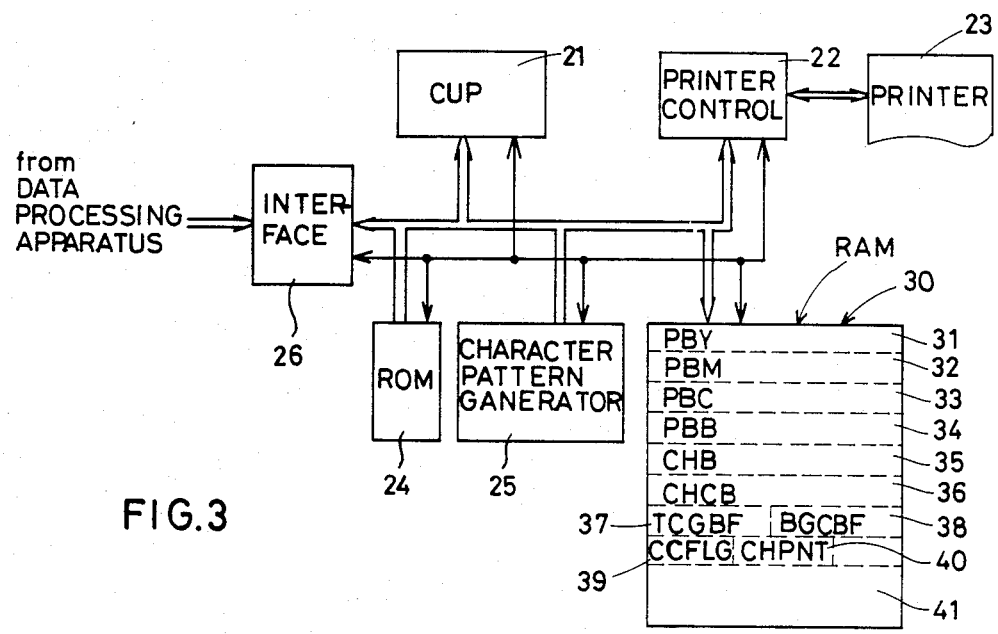
FIG. 3 is a block diagram of the embodiment of the print control system of the present invention.

FIG. 3 shows an embodiment of the print control system of the present invention. The print control system of the present invention includes a central processing unit (CPU) 21. A read only memory (ROM) 24 storing the operation program is connected to the central processing unit (CPU) 21 via a data line, an address line and a control line. The central processing unit (CPU) 21 controls the data receiving operation and the printing operation in accordance with the operation program stored in the read only memory (ROM) 24.

The print control system further includes a printer control unit 22 which controls the operation of a color ink jet system printer 23 shown in FIG. 1. The printer control unit 22 controls the issuance of the ink droplets from the sixteen (16) orifices shown in FIG. 2 in response to the location of the carriage 4 in the travelling course. The print control system is connected to receive the print data from the data processing apparatus via an interface 26. The data processing apparatus develops the print data of eight bits in a parallel fashion. That is, the interface 26 is connected to the data processing apparatus via an eight-line data transmitting line. The print data includes character code information which is applied to a character pattern generator (CG) 25. The character pattern generator (CG) 25 is implemented with a ROM for developing a character pattern signal in accordance with the character code information applied thereto.

The print control system of the present invention further includes a random access memory (RAM) 30 which has buffers 31 through 39, a character pointer (CHPNT) 40, and a control area 41 for flags and various buffers.

More specifically, the random access memory (RAM) 30 includes a yellow print buffer (PBY) 31 for storing a print signal for the yellow printing, a magenta print buffer (PBM) 32 for storing a print signal for the magenta printing, a cyan print buffer (PBC) 33 for storing a print signal for the cyan printing, and a black print buffer (PBB) 34 for storing a print signal for the black printing. If the print data has image information, the image data is introduced into the print buffers 31, 32, 33 and 34 in accordance with the color information. A character buffer (CHB) 35 has a capacity corresponding to one line printing. The character code information introduced from the data processing apparatus is sequentially applied to the character buffer (CHB) 35 and stored therein. A character color buffer (CHCB) 36 stores a color data for determining the color of each character of which code information is stored in the character buffer (CHB) 35. A temporary character generator buffer (TCGBF) 37 temporarily stores the character pattern signal of four rows at the position where the printing operation is conducted. The temporary character generator buffer (TCGBF) 37 has the memory capacity of 4 rows×eight (8) dots. A background buffer (BGCBF) 38 is provided for determining the background color. The background buffer (BGCBF) 38 has the memory capacity of 4×8 dot positions. A color code buffer (CCFLG) 39 temporarily stores the color code data which is supplied from the data processing apparatus when the character color is changed. The color code data temporarily stored in the color code buffer (CCFLG) 39 is utilized to memorize the color data in the character color buffer (CHCB) 36. The character pointer (CHPNT) 40 functions as an address pointer for controlling the reading operation conducted to the character buffer (CHB) 35.

Figure 4A:
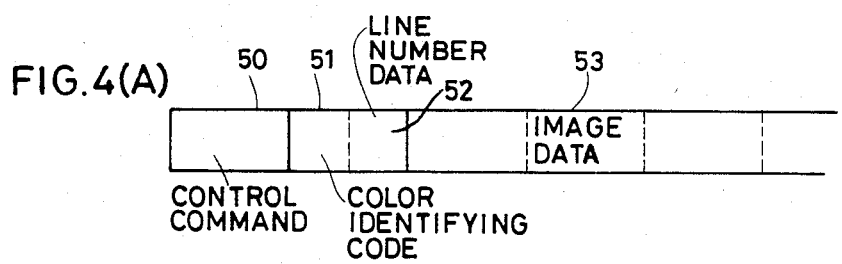
FIGS. 4(A), 4(B) and 4(C) are charts for explaining data supply from a data processing system to the print control system of FIG. 3.

Image information is applied from the data processing apparatus in a manner as shown in FIG. 4(A). The image information includes a control command 50 of one (1) byte, a color identifying code 51 of four (4) bits, a line number data 52, and an image data 53. The image data 53 is transferred by one (1) byte order, each byte representing the image pattern through the use of the logic "1" at the printing position and the logic "0" at the non-printing position. If the entire eight (8) bits are printing positions, the image data 53 is (F, F) (=(1111, 1111)). When two colors are desired to be mixed at the selected position, the same image data is transferred from the data processing apparatus for the different two colors.

Figure 4B:
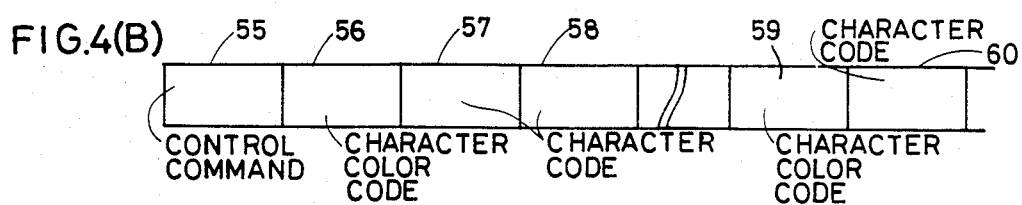
Figure 4C:
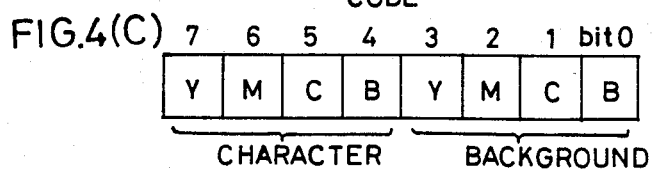
Figure 5:
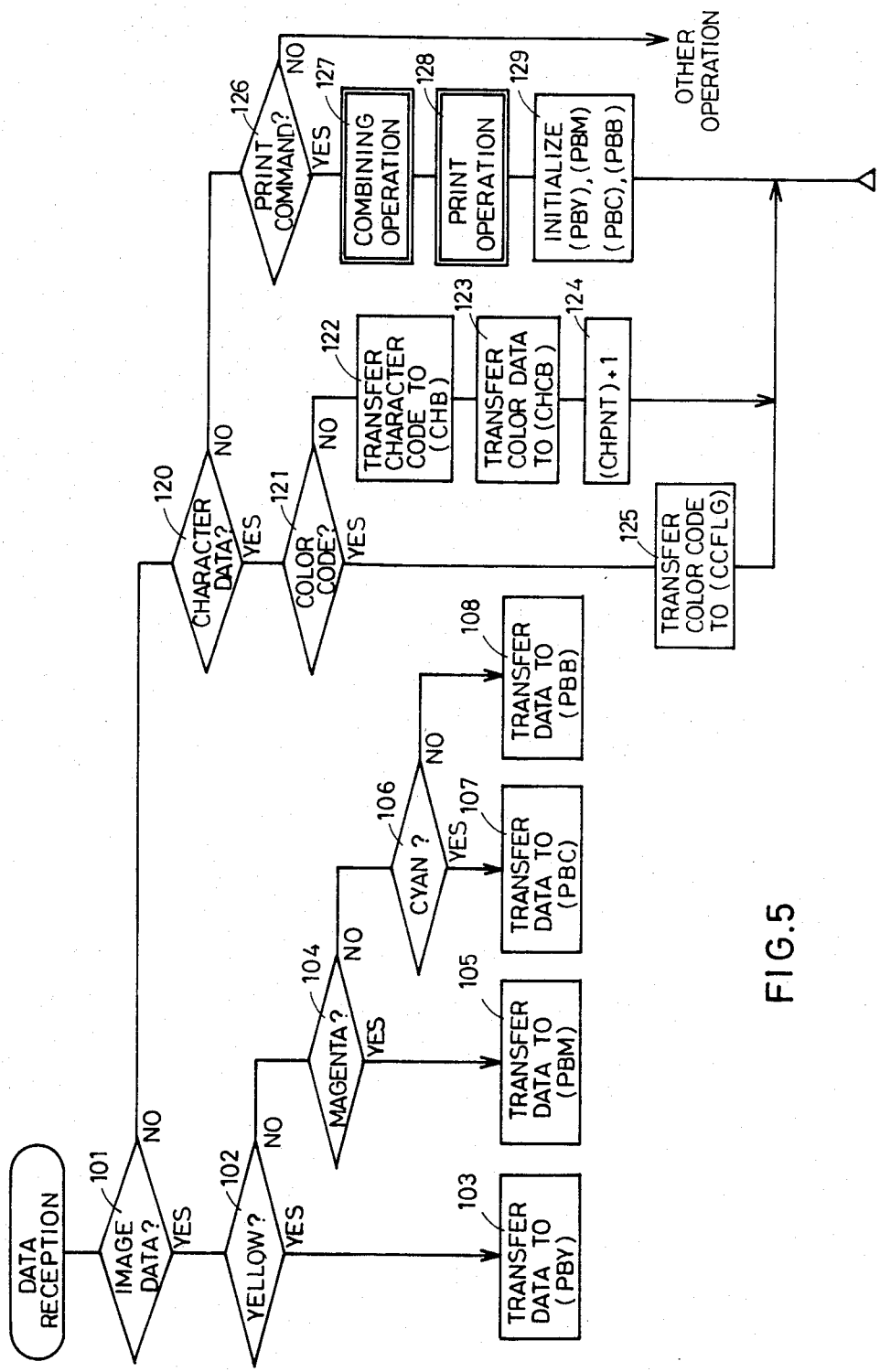
FIG. 5 is a flow chart for explaining a basic operation of the print control system of FIG. 3.

Character information is applied from the data processing apparatus in a manner as shown in FIG. 4(B). The character information includes a control command 55 of one (1) byte, a character color code 56 of eight (8) bits, and a character code 57 of eight (8) bits. The character color code 56 is transmitted when the character color is changed. In the example of FIG. 4(B), another character color code 59 is transmitted before a character code 60. FIG. 4(C) shows the character color code in detail. The bits "0" to "3" in the character color code 56, 59 are assigned to represent the background color, and the bits "4" through "7" are assigned to represent the character color. More specifically, the bit "0" represents whether the background includes black, the bit "1" represents whether the background has cyan, the bit "2" represents whether the background includes magenta, and the bit "3" represents whether the background includes yellow. Similarly, the bit "4" represents whether the character includes black, the bit "5" represents whether the character includes cyan, the bit "6" represents whether the character includes magenta, and the bit "7" represents whether the character includes yellow. Accordingly, when the black character is desired to be printed on the yellow background, the character color code (56, 59) is (0001,1000). When the red (mixture of yellow and magenta) character is desired to be printed on the cyan background, the character color code (56, 59) is (1100,0010).

In this way, the character information, the image information and the background color information are applied from the data processing apparatus to the color ink jet system printer. When the character information and the image information overlap with each other, in accordance with the present invention, the priority is applied to the character information. Furthermore, the priority is applied to the image information with respect to the background color in order to obtain a clean printing.

An operational mode of the print control system of the present invention will be described with reference to flow charts of FIGS. 5, 6, 7(A) and 7(B).

IMAGE DATA RECEIVING OPERATION

When the image information is transmitted to the print control system, the control command 50 is detected at the step 101, and the operation is advanced to the following steps 102 through 108. The color identifying code 51 is checked at the steps 102, 104 and 106. When the yellow color code is detected at the step 102, the operation is advanced to the step 103 at which the image data 53 is applied to the yellow print buffer (PBY) 31 of the selected line number determined by the line number data 52. In this way, the image data 53 is transferred to the selected line in the print buffers 31, 32, 33 and 34 in accordance with the color identifying code 52 and the line number data 52.

CHARACTER DATA RECEIVING OPERATION

When the character information is transmitted to the print control system, the control command 55 is detected at the step 120, and the operation is advanced to the following steps 121 through 129. The character color code 56 is first detected at the step 121, and the transmitted character color code 56 is transferred to the color code buffer (CCFLG) 39 at the following step 125. Thereafter, the character codes 57 and 58 are received. The received character code is transferred to a selected position in the character buffer (CHB) 35 at the step 122 in accordance with the contents stored in the character pointer (CHPNT) 40. Then, at the step 123, the character color code stored in the color code buffer (CCFLG) 39 is transferred to a selected position in the character color buffer (CHCB) 36 in accordance with the contents stored in the character pointer (CHPNT) 40. Then, contents stored in the character pointer (CHPNT) 40 are increased by one at the step 124 to prepare the system for the reception of the next character code.

When the four row image data has been received, or when the four row image data has been received after the reception of the one line character data, the central processing unit (CPU) 21 develops a print command at the step 126. In response to the print command, the image data is combined with the character data at the step 127. Then, the actual printing is carried out at the step 128. The combining operation and the actual printing operation will be described later in detail with reference to FIGS. 6, 7(A) and 7(B). When the actual printing operation is completed, the print buffers (PBY) 31, (PBM) 32, (PBC) 33, and (PBB) 34 are initialized at the step 129.

As already discussed above, one character is printed in a dot matrix of 8 (in the lateral direction) × 12 (in the vertical direction) dot positions. The actual printing operation is carried out in a manner that the four rows are printed at a same time. Thus, the one line character printing is completed when the carriage 4 conducts the lateral travelling operation three times. That is, the four row image information must be applied three times to complete the one line character printing. When the one line character pattern printing is completed, (When twelve (12) rows are printed by travelling the carriage 4 in the laterl direction three times), the character codes for the next one line are transmitted.

PRINTING OPERATION

Now assume that the color pattern shown in FIG. 8 is printed. The color pattern includes the black character "A", the magenta and cyan image pattern, and the yellow background. The print buffers (PBY) 31, (PBM) 32, (PBC) 33 and (PBB) 34 first store the four row image data. The character buffer (CHB) 35 stores the character codes for one line printing. The character color buffer (CHCB) 36 stores the color data for each character stored in the character buffer (CHB) 35.

Figure 6:
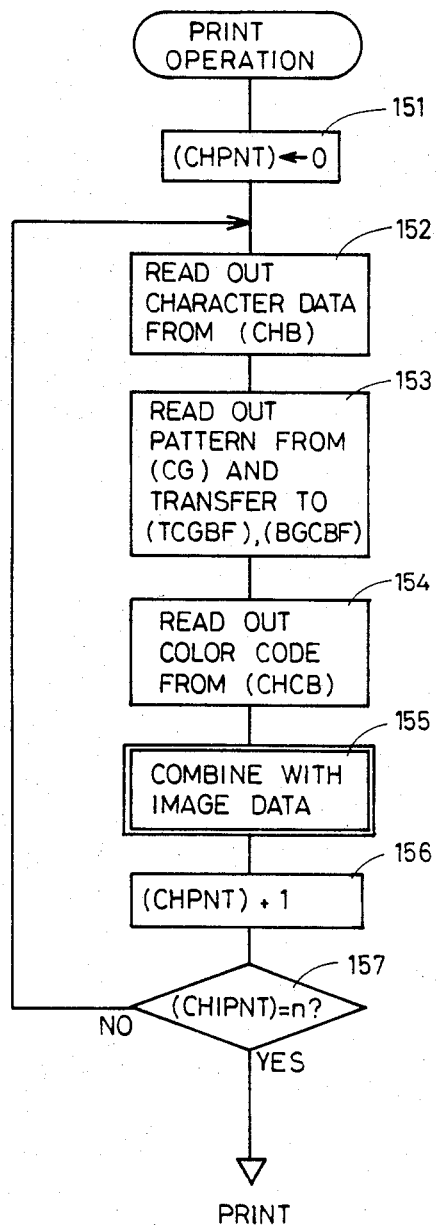
FIG. 6 is a flow chart for explaining a print operation conducted by the print control system of FIG. 3.
Figure 7B:
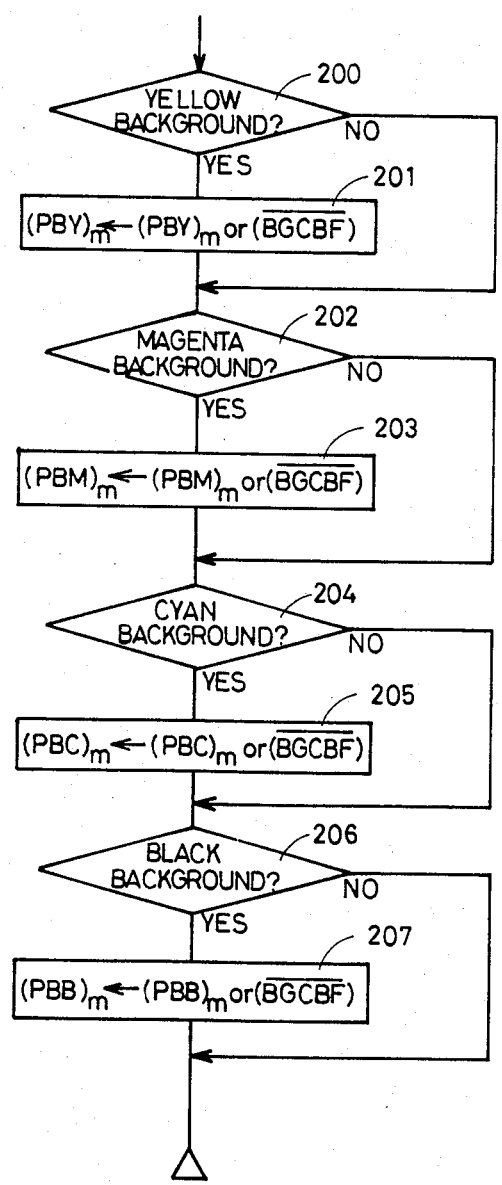

The printing operation is conducted in accordance with the program shown in FIG. 6. First, the character pointer (CHPNT) 40 is reset at the step 151. The character code stored in the character buffer (CHB) 35 is read out in accordance with the contents stored in the character pointer (CHPNT) 40 (step 152). The thus read out character code is applied to the character pattern generator (CG) 25 to develop the corresponding character pattern. The character pattern of four (4) row × eight (8) column dots of the position where the printing is currently conducted is supplied to the temporary character generator buffer (TCGBF) 37 and the background buffer (BGCBF) 38 (step 153). The color data of the position determined by the character pointer (CHPNT) 40 is read out from the character color buffer (CHCB) 36 at the step 154. Then, the character pattern is combined with the image pattern at the step 155 to introduce the combined pattern into the print buffers (PBY) 31, (PBM) 32, (PBC) 33 and (PBB) 34. The combining operation will be described later with reference to FIGS. 7(A) and 7(B), in detail. Thereafter, contents stored in the character pointer (CHPNT) 40 are increased by one at the step 156. These operations are repeated till the contents stored in the character pointer (CHPNT) 40 reach the line length (n) (step 157). Then, the actual printing operation is carried out at the step 128 shown in FIG. 5.

CHARACTER/IMAGE PATTERN COMBINING OPERATION

Now assume the character pattern and the image pattern are combined for producing the color pattern of lines L21, L22, L23 and L24 in FIG. 8. As already discussed above with reference to the step 153 in FIG. 6, the background buffer (BGCBF) 38 stores the character pattern "A" as shown in FIG. 9(A). The yellow print buffer (PBY) 31 stores the pattern shown in FIG. 9(E), the magenta print buffer (PBM) 32 stores the pattern shown in FIG. 9(G), the cyan print buffer (PBC) 33 stores the pattern shown in FIG. 9(I), and the black print buffer (PBB) 34 stores the pattern shown in FIG. 9(K) when the image information is transmitted. In FIGS. 9(A) through 9(L), the solid circle represents the logic data "1", and the blank circle represents the logic data "0". The color data related to the current character code is read out from the character color buffer (CHCB) 36 at the step 154 in FIG. 6, and the operation is advanced to the step 170 of FIG. 7(A).

The step 170 checks whether the color data stored in the character color buffer (CHCB) 36 is yellow. In this example, the operation is advanced to the step 173 because the character "A" should be printed with the black ink droplet. At the step 173, the logical sum of the data stored in the background buffer (BGCBF) 38 and the yellow print buffer (PBY) 31 is obtained. The thus obtained logical sum is introduced into and stored in the background buffer (BGCBF) 38. In this example, the data stored in the background buffer (BGCBF) 38 does not change because the yellow print buffer (PBY) 31 does not store the image data as shown in FIG. 9(E). At the following step 174, the logical product of the data stored in the yellow print buffer (PBY) 31 and the inverted data of the data stored in the temporary character generator buffer (TCGBF) 37 is obtained. The thus obtained logical product is introduced into and stored in the yellow print buffer (PBY) 31. In this example, the data never changes because the yellow print buffer (PBY) 31 does not store any image data.

The step 178 checks whether the color data stored in the character color buffer (CHCB) 36 is magenta. In this example, the operation is advanced to the step 181, where the logical sum of the data stored in the background buffer (BGCBF) 38 and the magenta print buffer (PBM) 32 is obtained. The thus obtained logical sum is introduced into and stored in the background buffer (BGCBF) 38. In this case, the data stored in the background buffer (BGCBF) 38 changes to the data shown in FIG. 9(B) because the magenta print buffer (PBM) 32 previously stores the pattern shown in FIG. 9(G). At the following step 182, the logical product of the pattern stored in the magenta print buffer (PBM) 32 and the inverted pattern of the data stored in the temporary character generator buffer (TCGBF) 37 is obtained. The thus obtained logical product is introduced into and stored in the magenta print buffer (PBM) 32. In this case, the pattern data stored in the magenta print buffer (PBM) 32 changes to the pattern shown in FIG. 9(H), which corresponds to the image pattern previously stored in the magenta print buffer (PBM) 32, but does not include the marking dot at a position where the character pattern overlaps the image pattern.

The step 183 checks whether the color data stored in the character color buffer (CHCB) 36 is cyan. In this example, the operation is advanced to the step 186, where the logical sum of the pattern stored in the background buffer (BGCBF) 38 and the cyan print buffer (PBC) 33 is obtained. The thus obtained logical sum is introduced into and stored in the background buffer (BGCBF) 38. That is, the pattern stored in the background buffer (BGCBF) 38 changes to the pattern shown in FIG. 9(C). At the following step 187, the logical product of the pattern stored in the cyan print buffer (PBC) 33 and the inverted pattern of the data stored in the temporary character generator buffer (TCGBF) 37 is obtained. The thus obtained logical product is introduced into and stored in the cyan print buffer (PBC) 33. That is, the pattern data stored in the cyan print buffer (PBC) 33 changes to the pattern shown in FIG. 9(J). The pattern shown in FIG. 9(J) corresponds to the image pattern of FIG. 9(I) which is previously stored in the cyan print buffer (PBC) 33, but does not include the marking dot at a position where the character pattern overlaps the image pattern.

The step 188 checks whether the color data stored in the character color buffer (CHCB) 36 is black. In this example, the operation is advanced to the step 189, where the logical sum of the pattern data stored in the black print buffer (PBB) 34 and the temporary character generator buffer (TCGBF) 37 is obtained. The thus obtained logical sum is introduced into the black print buffer (PBB) 34. The black print buffer (PBB) 34 does not previously store any image data as shown in FIG. 9(K) and, therefore, the pattern identical to the character pattern is introduced into the black print buffer (PBB) 34 as shown in FIG. 9(L). At the following step 190, the logical sum of the pattern data stored in the background buffer (BGCBF) 38 and the black print buffer (PBB) 34 is obtained. The thus obtained logical sum is introduced into and stored in the background buffer (BGCBF) 38. In this case, the pattern data does not change from the pattern shown in FIG. 9(C).

In summary, by practicing the steps 172, 173, 180, 181, 185, 186, 190 and 191, the background buffer (BGCBF) 38 stores the logical sum of the character pattern and the image pattern of current four rows. The thus obtained composite pattern is utilized to obtain the background pattern in later stage. By practicing the steps 171, 179, 184 and 189, the character pattern is memorized in a selected print buffer (PBY) 31, (PBM) 32, (PBC) 33 or (PBB) 34 determined by the color data stored in the character color buffer (CHCB) 36. The steps 174, 182, 187 and 192 function to remove a printing dot from the image pattern at a point where the character pattern overlaps the image pattern. That is, the steps 174, 182, 187 and 192 are provided for applying the priority to the character pattern than the image pattern. The steps 172, 173, 180, 181, 185, 186, 190 and 191 are provided for applying the priority to the image pattern than the background pattern.

The background pattern formation is carried out at the steps 200 through 207. The step 200 checks whether the background is yellow by reading out the background color data from the character color buffer (CHCB) 36. In this example, the operation is advanced to the step 201, where the logical sum of the pattern data stored in the yellow print buffer (PBY) 31 and the inverted data of the pattern data stored in the background buffer (BGCBF) 38 is obtained. The thus obtained logical sum is introduced into the yellow print buffer (PBY) 31. That is, the pattern data stored in the yellow print buffer (PBY) 31 changes from the pattern shown in FIG. 9(E) to the pattern shown in FIG. 9(F). The step 202 checks whether the background should be magenta. The step 204 is provided for checking whether the background should be cyan. The step 206 checks whether the background should be black.

When the character/image pattern combining operation is completed, the program is advanced to the step 156 shown in FIG. 6.

In the foregoing embodiment, four rows are simultaneously printed while the carriage 4 moves in the lateral direction. If twelve (12) orifices are aligned in the vertical direction for each color, twelve (12) rows can be printed at a same time. That is, one character line can be printed at the same time.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A print control system for a color image printer having a printer head including a plurality of printing elements of different colors for printing multi-color image on a second receiving medium, said print control system comprising:
    first storing means for storing image pattern information;
    second storing means for storing character code information;
    a pattern generator developing a character pattern data in accordance with the character code information stored in said second storing means;
    third storing means for storing color data for each character code information;
    a plurality of print buffers, each of the print buffers being associated with one of said plurality of printing elements;
    selection means for selecting one of said print buffers in accordance with said color data stored in said third storing means;
    first transferring means for transferring said character pattern data developed from said pattern generator to the print buffer selected by said selection means;
    second transferring means for transferring an image pattern data to a selected print buffer in accordance with said image pattern information stored in said first storage means, thereby combining said character pattern data with said image pattern data;
    said second transferring means including priority determining means for applying a priority to said character pattern data rather than said image pattern data when said image pattern data has an imaging point which overlaps a printing point determined by said character pattern data;
    third transferring means for transferring a combined pattern data stored in said print buffers to said printer head;
    background pattern forming means for providing a background pattern;
    said background pattern forming means including inverting means for inverting said character pattern data developed from said pattern generator, thereby obtaining an inverted pattern data; and
    fourth transferring means for transferring said inverted pattern data to a selected print buffer in accordance with background color data, thereby combinining said combined pattern data with said inverted pattern data.

2. The print control system of claim 1, further comprising another priority determining means associated with said fourth transferring means for applying a priority to said image pattern data rather than said inverted pattern data when said inverted pattern data has an imaging point which overlaps a printing point determined by said image pattern data.

3. A color ink jet system printer comprising:
    a carriage which travels in the lateral direction;
    a printer head mounted on said carriage, said printer head including a nozzle unit provided with at least four orifices for emiting yellow ink droplets, magenta ink droplets, cyan ink droplets and black ink droplets, respectively;
    at least four print buffers associated with said at least four orifices;
    data receiving means for introducing image pattern information and character pattern information, said image pattern information including image color data and image pattern data, and said character pattern information including character color data, character code data and background color data;
    first transferring means for transferring said image pattern data to a selected one of said print buffers in accordance with said image color data;
    first storing means for storing said character code data;
    second storing means for storing said character color data;
    a character pattern generator developing a character pattern data in accordance with said character code data stored in said first storing means;
    inverting means for inverting said character pattern data developed from said character pattern generator and developing an inverted pattern data;
    second transferring means for transferring said character pattern data developed from said character pattern generator to a selected one of said print buffers in accordance with said character color data stored in said second storing means, after combining said character pattern data with said image pattern data previously stored in said selected one of said print buffers;
    first priority assigning means associated with said second transferring means for applying a priority to said character pattern data rather than said image pattern data when said character pattern data has a printing point which overlaps a printing point determined by said image pattern data;
    third transferring means for applying combined pattern data stored in said print buffers to said printer head; and
    fourth transferring means for transferring said inverted pattern data developed from said inverting means to a selected one of said print buffers in accordance with said background color data included in said character pattern information, after combining said inverted pattern data with said combined pattern data previously stored in said selected one of said print buffers.

4. The color ink jet system printer of claim 3, further comprising:
    second priority assigning means associated with said fourth transferring means for applying a priority to said combined pattern data previously stored in said print buffer rather than said inverted pattern data when said combined pattern data previously stored in said print buffer has a printing point which overlaps a printing point determined by said inverted pattern data.

* * * * *